United States Patent
Navale et al.

(10) Patent No.: US 9,777,574 B2
(45) Date of Patent: Oct. 3, 2017

(54) METHOD FOR REPAIRING A GAS TURBINE ENGINE BLADE TIP

(71) Applicant: Siemens Energy, Inc., Orlando, FL (US)

(72) Inventors: Atul L. Navale, Houston, TX (US); Ahmed Kamel, Orlando, FL (US); Gerald J. Bruck, Oviedo, FL (US); Ivan F. Oliver Vargas, Houston, TX (US)

(73) Assignee: SIEMENS ENERGY, INC., Orlando, FL (US)

( * ) Notice: Subject to any disclaimer, the term of this patent is extended or adjusted under 35 U.S.C. 154(b) by 420 days.

(21) Appl. No.: 14/461,476

(22) Filed: Aug. 18, 2014

(65) Prior Publication Data
US 2016/0047244 A1    Feb. 18, 2016

(51) Int. Cl.
| | |
|---|---|
| B23K 9/04 | (2006.01) |
| F01D 5/00 | (2006.01) |
| F01D 5/02 | (2006.01) |
| B23P 6/00 | (2006.01) |
| F01D 5/20 | (2006.01) |

(52) U.S. Cl.
CPC .............. F01D 5/005 (2013.01); B23P 6/002 (2013.01); F01D 5/027 (2013.01); F01D 5/20 (2013.01); F05D 2240/307 (2013.01)

(58) Field of Classification Search
CPC . F01D 5/027; F01D 5/005; F01D 5/20; F01D 2240/307; B23P 6/002; B23K 26/345

USPC .......... 148/428, 442, 527; 219/73.21, 76.13, 219/121.63, 121.64, 121.66
See application file for complete search history.

(56) References Cited

U.S. PATENT DOCUMENTS

| | | | |
|---|---|---|---|
| 5,189,279 A * | 2/1993 | Foster, III | B23K 9/046 219/137 R |
| 5,822,852 A | 10/1998 | Bewlay et al. | |
| 6,164,914 A * | 12/2000 | Correia | F01D 5/186 415/115 |
| 6,332,272 B1 * | 12/2001 | Sinnott | B23P 6/002 29/402.08 |
| 6,454,156 B1 | 9/2002 | Tras, Jr. et al. | |
| 6,723,278 B1 | 4/2004 | Lu et al. | |
| 7,278,829 B2 | 10/2007 | Roedl et al. | |
| 7,587,818 B2 | 9/2009 | Gorman et al. | |
| 8,091,228 B2 | 1/2012 | Hiskes | |
| 8,137,069 B2 | 3/2012 | Khanin et al. | |
| 8,277,193 B1 | 10/2012 | Brostmeyer et al. | |
| 8,324,526 B2 | 12/2012 | Gruger et al. | |
| 8,561,298 B2 | 10/2013 | Morin et al. | |
| 2002/0136638 A1 | 9/2002 | Junkin | |

(Continued)

FOREIGN PATENT DOCUMENTS

JP    2013068085 A    4/2013

Primary Examiner — Thien S Tran

(57) ABSTRACT

A method, including: replacing an original blade shelf (16) of a gas turbine engine blade (10) with a new blade shelf (64) that is located closer to a base (18) of the blade than the original blade shelf; adding mass to the blade until a mass of the blade with the new blade shelf is greater than a mass of the blade with the original blade shelf in order to maintain a same contribution by the blade with the new blade shelf as a contribution by the blade with the original blade shelf to a dynamic balance of a rotor arrangement.

14 Claims, 2 Drawing Sheets

(56) References Cited

U.S. PATENT DOCUMENTS

| | | |
|---|---|---|
| 2002/0170176 A1 | 11/2002 | Rigney et al. |
| 2005/0091848 A1* | 5/2005 | Nenov .................... B23P 6/005 29/889.1 |
| 2006/0218788 A1 | 10/2006 | Boulnois et al. |
| 2007/0189897 A1 | 8/2007 | Pietrazkiewicz et al. |
| 2009/0049689 A1 | 2/2009 | Hiskes |
| 2009/0255307 A1 | 10/2009 | Davis et al. |
| 2009/0311121 A1 | 12/2009 | Kelly |
| 2010/0028158 A1 | 2/2010 | Richter et al. |
| 2010/0200189 A1 | 8/2010 | Qi et al. |
| 2011/0038734 A1 | 2/2011 | Marra |
| 2012/0110848 A1 | 5/2012 | Szela et al. |
| 2012/0222306 A1 | 9/2012 | Mittendorf et al. |
| 2013/0104397 A1 | 5/2013 | Bunker |
| 2013/0136868 A1* | 5/2013 | Bruck ...................... B05D 3/06 427/554 |
| 2013/0140278 A1 | 6/2013 | Bruck et al. |
| 2013/0298400 A1 | 11/2013 | Munshi et al. |

\* cited by examiner

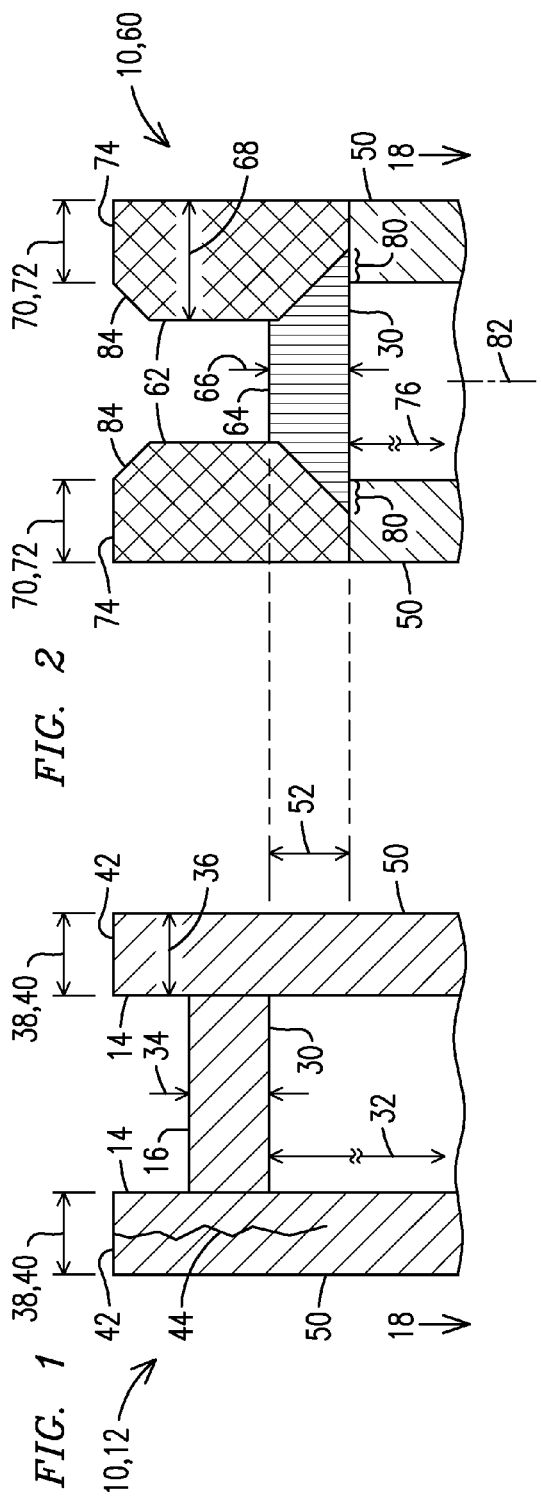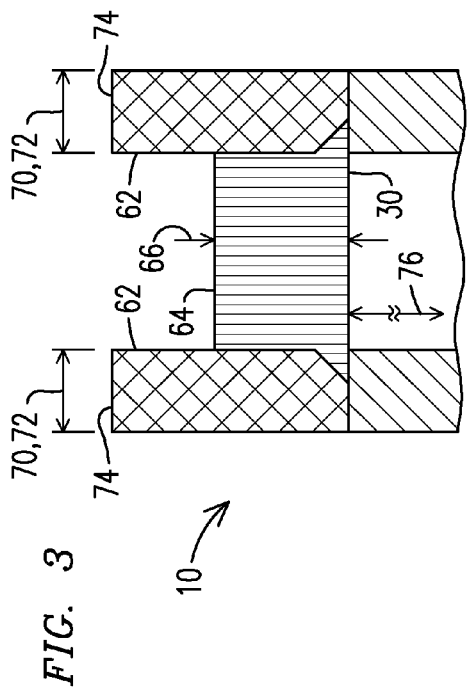

METHOD FOR REPAIRING A GAS TURBINE ENGINE BLADE TIP

FIELD OF THE INVENTION

The invention relates to repair of gas turbine engine blades. In particular, the invention relates to lowering the blade shelf and adding weight to the blade to maintain a dynamic balance of the assembly with which the blade rotates.

BACKGROUND OF THE INVENTION

Blades used in the turbine section of gas turbine engines are exposed to combustion gases, high mechanical force, and foreign object impact. This, coupled with the high operating temperature, create high levels of stress in the blade. Blade tips, blade airfoil sections, and blade platforms are particularly susceptible to stress related damages, including areas of wear and cracks. Blade tips, (also known as tip caps), include blade tip shelves (an end piece of the airfoil) and blade squealers (elevated material surrounding the blade tip). The cracks may extend from the tip of the airfoil downward toward the platform, sometimes extending past the blade shelf adjacent the blade tip.

It is known to replace worn or cracked blade squealers and blade shelves by replacing them with a new, cast blade shelf, and new squealer material. A tip portion of the blade is removed, the new blade shelf is welded to the blade, and new squealer material may be welded to the blade. Unfortunately, cracking is very often found below (toward the platform) the tip shelf, extending into the airfoil body. For example, the cracks may extend up to 30 mm below the blade tip. Portions of the cracks that extend below the bottom of the blade shelf cannot be reached with the above repair technique. As a result, blades with such cracks cannot be repaired. Consequently, there is room in the art for improved methods of repairing blade airfoils.

BRIEF DESCRIPTION OF THE DRAWINGS

The invention is explained in the following description in view of the drawings that show:

FIG. 1 is a schematic partial sectional view of a gas turbine engine blade.

FIG. 2 is schematic partial sectional view of the gas turbine blade of FIG. 1 with an exemplary embodiment of a new tip.

FIG. 3 is schematic partial sectional view of the gas turbine blade of FIG. 1 with an alternate exemplary embodiment of a new tip.

DETAILED DESCRIPTION OF THE INVENTION

Figure 4:
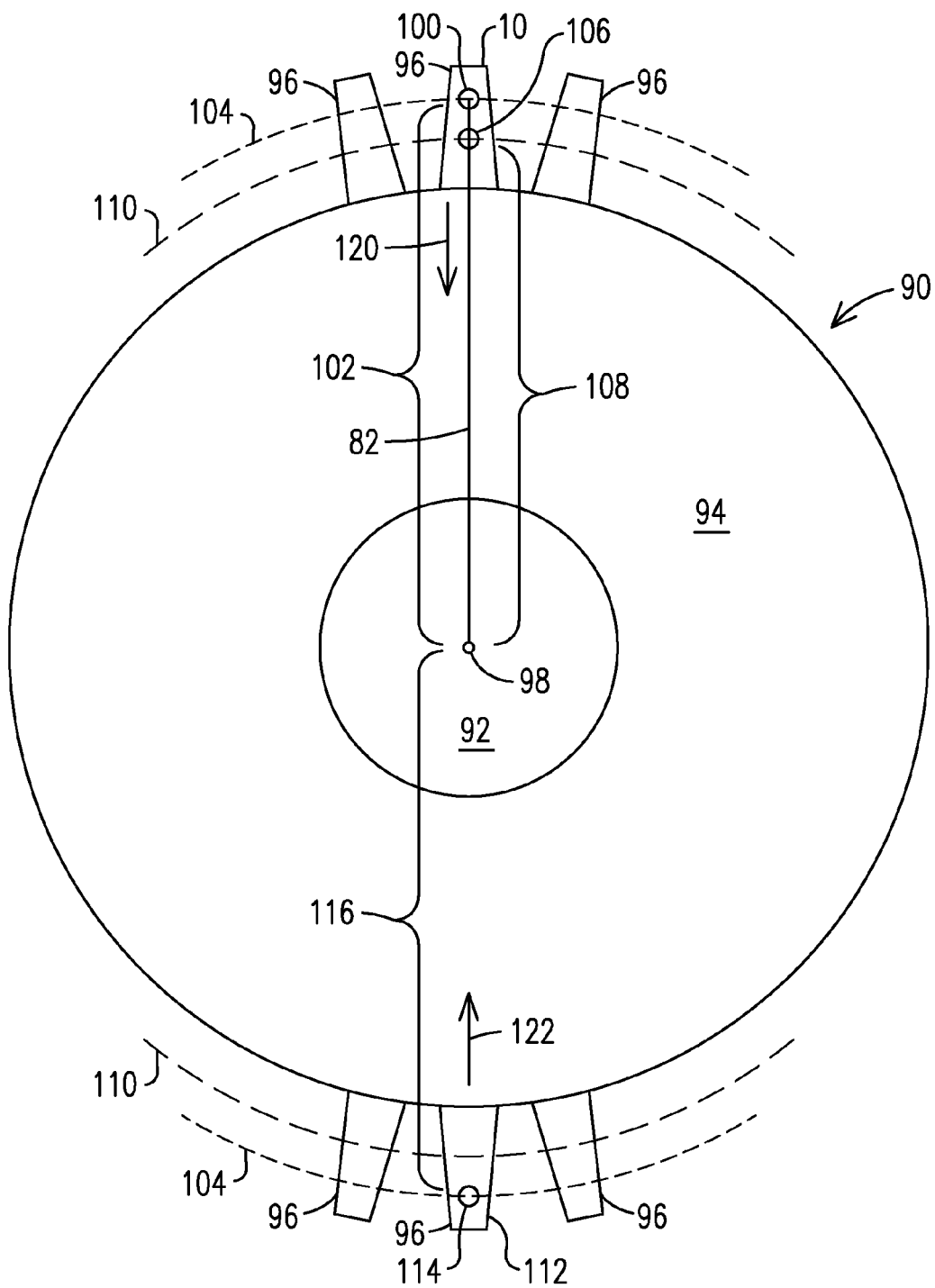
FIG. 4 schematically represents a rotor arrangement that incorporates gas turbine engine blades.

The present inventors have developed an innovative way of repairing a tip of a gas turbine blade. Specifically, the inventors propose to remove and replace a tip of the blade, including a tip shelf. The new tip shelf will be positioned closer to the base of the blade than the original blade shelf. Advantageously, this enables the removal of cracks that extend past the original tip shelf. Lowering the shelf moves the blade's center of mass (COM) toward the base of the blade. Since the blade is used as part of a rotor arrangement in the gas turbine engine, moving the COM could upset a dynamic balance of the rotor arrangement. To account for this change in rotational momentum, extra mass is added to the blade with the lowered blade shelf. The blade with the lowered shelf and relatively greater mass is configured to contribute to the dynamic balance of the rotor arrangement in the same manner as the blade with the original blade shelf and the relatively lower mass. In other words, the rotational momentum of the blade with the lowered blade shelf is tailored to match the rotational momentum of the blade with the original blade shelf. As a result, the dynamic balance of the arrangement remains intact, despite the different COM and mass of the blade.

FIG. 1 is a schematic partial sectional view of a gas turbine engine blade 10 with a tip 12 having an original squealer 14 and an original blade shelf 16. A base 18 (not shown) of the blade 10 is disposed toward a bottom of the page. A bottom 30 of the original blade shelf 16 is disposed at an original distance 32 from a given point (not shown) on the base 18 of the blade. The original blade shelf 16 is characterized by an original blade shelf thickness 34. The original squealer 14 is characterized by an original squealer thickness 36 and an original interface 38 having an original interface width 40 for each original squealer tip 42. A crack 44 is visible extending from the original squealer tip 42 downward, past the bottom 30 of the original blade shelf 16. A crack 44 may extend, for example, 30 mm from the original squealer tip 42.

Prior art techniques are able to repair cracks that reach a point above the bottom 30 of the original blade shelf 16 by removing the material surrounding the cracks and replacing it via a welding process. Squealers are often disposed on a skin 50 of the airfoil. The skin is subject to harsh conditions and is often composed of superalloy materials which are capable of providing relatively long service life. It ranges from difficult to impossible to repair some of these superalloy materials. In contrast, the tip of the blade 10 is subject to less harsh condition. Consequently, the material used to replace the original squealer 14 and the original blade shelf 16 may be different than the superalloy that forms the skin 50.

Often this different material is less structural. It may be more weldable, but may not provide (or need to provide) the same service life as material closer to the base of the blade. In a prior art repair a pre-cast new blade shelf may be composed of a less structural material and/or welded to the blade using the less structural material. One example of a different material used for welding the tip shelf to the blade is Inconel® alloy 625 (IN625), manufactured by Special Metals Corporation of Hartford, Conn. and the same alloy by others under alternate trade names. IN625 may be used to form a ductile root pass. This reduces crack formation due to, for example, an imperfect fit-up. However, farther down the blade harsher operating conditions are encountered. Therefore the squealer and nearby material may be composed of a less structural material and/or welded to the blade using the less structural material. The limitations of this less structural material in the harsher environment restricts the distance 52 that the blade shelf can be relocated.

Additional factors may contribute to a determination of the maximum relocation distance 52. For example, the original blade shelf 16 holds the two original squealer tips 42 in a relative positional relationship with each other. Since they are cantilevered from the original blade shelf 16, moving the blade shelf too far away may jeopardize this positional relationship. Nonetheless, there is some latitude here that permits a maximum relocation distance 52 that the blade shelf can be moved, and it is this latitude that the method disclosed herein takes advantage of.

FIG. 2 is schematic partial sectional view of the blade 10 with an exemplary embodiment of a new tip 60 having a new squealer 62 and a new blade shelf 64. The portion that was removed may be cut off, leaving a planar surface for the new material. The new blade shelf 64 is characterized by a new blade shelf thickness 66. The new squealer 62 is characterized by a new squealer thickness 68, a new interface 70, and a new interface width 72 for each squealer tip 74. The bottom 30 of the new blade shelf 64 is disposed a new distance 76 from the given point (not shown) on the base 18 of the blade. The new distance 76 locates the bottom 40 of the new blade shelf 64 below the crack 44, which is now gone.

It can be seen that the bottom 30 of the new blade shelf 64 has been moved closer to the base 18 by the maximum relocation distance 52. Stated another way, the original distance 32 less the maximum relocation distance 52 is the new distance 76. In the exemplary embodiment shown, the new blade shelf 64 is a discrete part that has been welded to the skin 50 at a skin/shelf interface 80. The new blade shelf 64 may be, for example, a cast part. Likewise, the new squealer 62 has been welded to the skin and the new blade shelf.

The blade with the original blade shelf 16 constituted part of a rotor arrangement within the gas turbine engine. The rotor arrangement includes a rotor shaft and several disks, each with blades disposed around a perimeter of the disk. The rotor arrangement is balanced in three dimensions. A contribution of each component of the rotor arrangement is accounted for in the balanced rotor arrangement. If a component, such as a blade, is changed or modified, maintaining the dynamic balance of the rotor arrangement necessitates that the changed or modified blade contribute in the same way to the dynamic balance.

Moving the location of the new blade shelf 64 toward the rotor centerline brings a center of mass (COM) of the blade 10 with the new blade shelf closer to the base 18, considered herein a lowering of the COM. Lowering the blade shelf also lowers the COM of the blade 10 with the new blade shelf 64 with respect to the COM of the blade 10 with the original blade shelf 16. This lower reduces the rotational momentum of the blade 10 with the new blade shelf 64. In order to maintain the dynamic balance of the rotor arrangement, the blade 10 with the new blade shelf 64 and relatively lower COM must have mass added to adjust its center of mass and thereby return its rotational momentum to that of the blade 10 with the original blade shelf 16. Three dimensional balancing is complex. For sake of simplicity, the explanation herein is limited to adjustment of the COM of the blade 10 with the new blade shelf 64 toward or away from an axis of rotation (not shown) of the rotor arrangement and along an original COM radial line 82 established by the original COM. This is accomplished by adding mass symmetrically along the original COM radial line 82.

For example, mass can be added to the blade 10 with the new blade shelf 64 to move the COM of the final blade back radially outward toward the COM of the blade 10 with the original blade shelf 16. The resulting COM of the blade 10 with the new blade shelf 64 and with the added mass (the final blade) would be radially inward of the COM of the blade 10 with the original blade shelf 16, and radially outward of the blade 10 with the new blade shelf 64 but no extra mass. However, since the final blade would have the increased mass, the rotational momentum of the final blade would match the rotational momentum of the blade 10 with the original blade shelf 16.

Alternately, a relatively greater amount of mass may be added to the blade 10 with the new blade shelf 16 to move the COM of the final blade still farther radially inward. The resulting COM of the blade 10 with the new blade shelf and added mass (the final blade) would be farther radially inward of the COM of the blade 10 with the original blade shelf 16, and farther radially inward of the COM of the blade 10 with the new blade shelf 64 but no extra mass. However, since the final blade would have a relatively larger increase in extra mass, the rotational momentum of the final blade would match the rotational momentum of the blade 10 with the original blade shelf 16. As a result, maintaining the rotational momentum can be accomplished in many ways by coordinating the amount of extra mass used and a proper radial location.

It is understood that the blade 10 with the new blade shelf 64 could be called upon to further fine tune the dynamic balance of the rotor arrangement. Consequently, it is within the scope of the disclosure to also move the COM off of the original COM radial line to a location that will, when the blade 10 with the new blade shelf 64 is installed in the rotor arrangement, improve a dynamic balance of the rotor arrangement.

If nothing else changes in the rotor arrangement, the dynamic balance may improve overall. Alternately, if other changes are being made to the rotor arrangement, the blade 10 with the new blade shelf 64 may be a controllable variable in the rebalancing of the rotor arrangement. It is also conceivable that at least one pair of blades within a disk of blades are repaired. If so, the two new blade shelves of both blades may be lowered a same amount, and the two blades with new blade shelves could be disposed on opposite sides of the blade disk to ensure the dynamic balance of the rotor arrangement without adding any mass to either blade.

Adding mass to the blade 10 may be accomplished in any number of ways. In the exemplary embodiment shown, the extra mass has been added to the new squealer 62, as evidenced by the new squealer thickness 68 which is greater than the original squealer thickness 36. The extra mass may be added at any location of the blade 10; it need not be limited to a location at or beyond the new distance 76 from the given point (not shown) on the base 18 of the blade. For example, it may be added to the bottom 30 of the new blade shelf 64, or even lower within the blade 10.

It may be desirable that the new interface 70 be in the same location as the original interface 38, including a same elevation from the given point on the base 18, and/or the new interface width 72 be no larger than the original interface width 40. The original interface 38 may have already properly lined up with a groove worn in an abradable surface of a blade ring surrounding the blade disk. Locating the new interface 70 in the same place and having the new interface width be no greater than the original interface width 40 will prevent any further wear between the new interface 70 and the abradable surface. A chamfer 84 or similar feature, such as a fillet, or a notch etc, may enable the properly sized new interface width 72.

A different material may be used for the new blade shelf 64 and/or the new squealer 62. For example, if the new interface width 72 is to be larger, a softer material may be selected for the new squealer 62. This may occur when, for example, a new abradable surface is also installed around the blade disk. The material for the new squealer 62 may be different than the material for the new blade shelf 64. Since the materials selected for the new squealer 62 and the new blade shelf 64 may be less expensive than the superalloy used in the skin 50, it may be advantageous to add the extra mass as part of the less expensive materials.

In an alternate exemplary embodiment shown in FIG. 3, the extra mass may be added in the new blade shelf 64 in addition to or instead of adding the extra mass to the new squealer 62. For example the new blade shelf thickness 66 of the new blade shelf 64 may be larger than the original blade shelf thickness 34. The new interface 70 and the new interface width 72 may be the same as the original interface 38 and the original interface width 40, or they may be different.

While the extra mass has been shown as integral to the new squealer 62 and/or the new blade shelf 64, the extra mass may instead be a discrete mass that is added to the blade 10. For example, the discrete extra mass may be added on top of the new blade shelf 64, on the bottom 30 of the new blade shelf 64, on the inside of the new squealer 62, or even lower on the blade 10, such as on an inside surface of the skin 50. So long as the blade 10 with the new blade shelf 64 and the extra mass contributes properly to the dynamic balance of the rotor arrangement, it does not matter how the extra mass is added. As another extreme example, in terms of maintaining dynamic balance, the extra mass could be added as far down as on a bottom surface of the base 18 of the blade 10.

In an alternate exemplary embodiment, instead of welding a discrete new blade shelf 64 and new squealer 62, either or both may be formed using an additive manufacturing process. For example, a selective laser melting (SLM) process or a selective laser sintering (SLS) process may be used to form the new blade shelf 64 and/or the new squealer 62. Conventional SLM and SLS processes may be used when materials other than superalloys are used. In an exemplary embodiment where the substrate is a superalloy, the powder material may include a superalloy metal powder and a flux as described in U.S. patent publication number 2013/0140278 to Bruck et al. and incorporated in its entirety by reference herein. The ability to clad superalloys in this manner enables the new blade shelf 64 and the new squealer 62 to be formed of the same material as the skin 50. This may render the ductile root pass less necessary. The maximum relocation distance 52 is influenced by the structural contribution of the material used for the new blade shelf 64 and the new squealer 62. Consequently, using a superalloy material, which offers a greater structural strength, may increase the maximum relocation distance 52.

FIG. 4 schematically represents the rotor arrangement 90, including a rotor shaft 92, a blade disk 94, blades 96, and the blade 10. The rotor arrangement 90 rotates about the axis of rotation 98. An original COM 100 of the blade 10 with the original blade shelf 16 defines an original radius 102 that lies on the original COM radial line 82. When rotating about the axis of rotation 98 the original COM 100 defines an original circle 104 characterized by the original radius 102. A new COM 106 of the blade 10 with the new blade shelf 64 and the added mass (the final blade) defines a new radius 108 that lies on the original COM radial line 82. When rotating about the axis of rotation 98 the new COM 106 defines a new circle 110 characterized by the new radius 108.

For sake of simplicity of explanation, the dynamic balance of the rotor arrangement 90 in this example will be governed by the contribution (rotational momentum) of the blade 10, and an opposite blade 112 of equal mass disposed on the blade disk 94 at a location 180 degrees from the blade 10. The opposite blade 112 may be characterized by an opposite blade COM 114 that is also disposed at an opposite blade radius 116 from the axis of rotation 98 that is equal to the original radius 102. Consequently, both the original COM 100 and the opposite blade COM 114 rotate along the original circle. The blade disk 94 exerts a blade centripetal force 120 on the blade 10, and an opposite blade centripetal force 122 on the opposite blade 112. The centripetal forces are proportional to the mass of the blade and the magnitude of the original radius 102. Since the mass of blade 10 and the opposite blade COM 114 are equal in this example, as are the original radius 102 and the opposite blade radius 116, the dynamic balance of the rotor arrangement 90 is established.

The new radius 108 of the new COM 106 is shorter than the original radius 102. Since the centripetal force is proportional to the magnitude of the radius, if the mass of the blade 10 with the new blade shelf 64 were not increased by an amount of extra mass, the centripetal force required to hold the blade 10 with the new blade shelf 64 in place would be less than was required to hold the blade 10 with the original blade shelf 16. The result would be that the opposite blade centripetal force 122 would be greater than the blade centripetal force 120, which would disrupt the dynamic balance of the rotor arrangement 90. Since the centripetal force is proportional to not only the magnitude of the original radius 102, but also the mass of the blade, increasing the mass of the blade 10 with the new blade shelf 64 by the extra mass will increase the blade centripetal force 120. Enough extra mass can be added to the blade 10 with the new blade shelf 64 to restore equilibrium between the blade centripetal force 120 and the opposite blade centripetal force 122, and this, in turn, will restore the dynamic equilibrium of the rotor arrangement 90.

Dynamic balancing can be significantly more complex than this example demonstrates. However, the same principles applied here can be applied in more complex, three dimensional balancing. The location of the new COM 106 can be moved in any of the three dimensions to restore dynamic balance to the rotor arrangement 90, such as when no other changes have been made to the rotor arrangement 90 that would affect the dynamic balance. Alternately, the location of the new COM 106 can be moved in any of the three dimensions to establish a dynamic balance in a rotor arrangement 90 where other changes have been made that alter the original dynamic balance. For example, in the latter case, changes may be made to the rotor arrangement 90 as part of a servicing such that if the blade 10 with the original blade shelf 16 were reinstalled, dynamic balance would not be achieved. In such a case the dynamic balance must be reestablished and the blade 10 with the new blade shelf 64 and the extra mass may be used as a final tuning component to reestablish the dynamic balance of the rotor arrangement 90. Likewise, the amount of mass added to the blade 10 with the new blade shelf 64 may be tailored to restore or to reestablish a dynamic balance of the rotor arrangement 90.

From the foregoing it can be seen that the inventors have devised a method for repairing a blade that permits repair of components that previously could not be repaired. Consequently, this represents an improvement in the art.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method, comprising:
to gas turbine engine blade having an original blade shelf and a cracked portion having at least one crack extending past a bottom of the original blade shelf, removing the cracked portion of the blade and replacing the original blade shelf with a new blade shelf that is located closer to a base of the blade than the original blade shelf;
adding mass to the blade until a mass of the blade with the new blade shelf is greater than a mass of the blade with the original blade shelf; and
maintaining a same contribution by the blade with the new blade shelf as a contribution by the blade with the original blade shelf to a dynamic balance of a rotor arrangement.

2. The method of claim 1, further comprising welding a pre-cast new blade shelf to the blade.

3. The method of claim 1, further comprising forming the new blade shelf through an additive manufacturing process.

4. The method of claim 3, further comprising traversing an energy beam across a powder material comprising a superalloy powder and a powder flux to form a layer of the blade shelf during the additive manufacturing process.

5. The method of claim 1, further comprising replacing an original squealer with a new squealer, and adding the mass to the new squealer of the blade.

6. The method of claim 5, further comprising tapering the new squealer to match a same interface size as an original squealer interface size.

7. The method of claim 1, further comprising replacing an original squealer with a new squealer, and forming the new squealer with a different material than a material that formed the original squealer.

8. The method of claim 1, further comprising adding the mass to the new blade shelf.

9. A method, comprising:
removing an original blade shelf from a gas turbine engine blade, the gas turbine engine blade having an original blade shelf and at least one crack extending past a bottom of an original blade shelf;
removing a portion of the blade comprising the at least one crack;
securing a new blade shelf to a remaining portion of the blade at location closer to a base of the blade than the original blade shelf; and
increasing a mass of the blade with the new blade shelf so that it is greater than a mass of the blade with the original blade shelf.

10. The method of claim 9, further comprising increasing the mass of the blade with the new blade shelf until a centripetal force exerted on the blade with the new blade shelf when operating in the gas turbine engine equals a centripetal force exerted on the blade with the original blade shelf when operating in the gas turbine engine under the same conditions.

11. The method of claim 9, further comprising welding a pre-cast new blade shelf to the blade.

12. The method of claim 9, further comprising replacing an original squealer with a new squealer, and adding the mass to the new squealer of the blade.

13. The method of claim 9, further comprising replacing an original squealer with a new squealer, and forming the new squealer with a different material than a material that formed the original squealer.

14. The method of claim 9, further comprising adding the mass to the new blade shelf.

* * * * *